US010150227B2

(12) United States Patent
Warnes et al.

(10) Patent No.: US 10,150,227 B2
(45) Date of Patent: Dec. 11, 2018

(54) METHOD FOR PRODUCING WOOD FIBRE PELLETS

(71) Applicant: New Zealand Forest Research Institute Limited, Rotorua (NZ)

(72) Inventors: Jeremy Martin Warnes, Rotorua (NZ); Alan Fernyhough, Rotorua (NZ); Charles Ross Anderson, Rotorua (NZ); Brendan James Lee, Rotorua (NZ); Michael Ralph Juergen Witt, Rotorua (NZ)

(73) Assignee: NEW ZEALAND FOREST RESEARCH INSTITUTE LIMITED, Rotorua (NZ)

( * ) Notice: Subject to any disclaimer, the term of this patent is extended or adjusted under 35 U.S.C. 154(b) by 254 days.

(21) Appl. No.: 15/364,447

(22) Filed: Nov. 30, 2016

(65) Prior Publication Data

US 2017/0080597 A1    Mar. 23, 2017

Related U.S. Application Data

(62) Division of application No. 11/922,887, filed as application No. PCT/NZ2005/000014 on Jun. 23, 2005, now Pat. No. 9,511,508.

(30) Foreign Application Priority Data

Jun. 23, 2004 (NZ) .................................... 530339

(51) Int. Cl.
| B27N 1/02 | (2006.01) |
| B27N 1/00 | (2006.01) |
| B27N 3/00 | (2006.01) |
| B27N 3/04 | (2006.01) |
| B29B 9/04 | (2006.01) |
| B29B 9/14 | (2006.01) |
| B29B 9/16 | (2006.01) |
| B29B 7/92 | (2006.01) |

(52) U.S. Cl.
CPC ................ B27N 1/02 (2013.01); B27N 1/00 (2013.01); B27N 3/002 (2013.01); B27N 3/04 (2013.01); B29B 9/04 (2013.01); B29B 9/14 (2013.01); B29B 9/16 (2013.01); B29B 7/92 (2013.01)

(58) Field of Classification Search
CPC ....................................................... B27N 1/02
See application file for complete search history.

(56) References Cited

U.S. PATENT DOCUMENTS

| 2,192,397 A | 3/1940 | Carlson |
| 3,765,934 A | 10/1973 | Gaylord |
| 3,869,432 A | 3/1975 | Gaylord |
| 3,894,975 A | 7/1975 | Gaylord |
| 3,900,685 A | 8/1975 | Gaylord |
| 3,943,079 A | 3/1976 | Gaylord |
| 3,949,133 A | 4/1976 | Santurri et al. |
| 3,958,069 A | 5/1976 | Hamed |
| 4,051,214 A | 9/1977 | Gaylord |
| 4,058,580 A | 11/1977 | Flanders |
| 4,414,267 A | 11/1983 | Casper et al. |
| 4,528,303 A | 7/1985 | Coran et al. |
| 4,717,742 A | 1/1988 | Segaud |
| 4,820,749 A | 4/1989 | Beshay |
| 5,082,605 A | 1/1992 | Beshay |
| 5,120,776 A | 6/1992 | Brooks et al. |
| 5,153,241 A | 10/1992 | Raj et al. |
| 5,183,622 A | 2/1993 | Beshay |
| 5,288,772 A | 2/1994 | Person |
| 5,792,264 A | 8/1998 | Frati |
| 5,827,607 A | 10/1998 | Hon |
| 5,938,994 A | 8/1999 | Deaner et al. |
| 6,270,883 B1 | 8/2001 | English et al. |
| 6,695,993 B2 | 2/2004 | Sears et al. |
| 2001/0009309 A1 | 7/2001 | Taguchi |
| 2003/0186052 A1 | 10/2003 | Crews |
| 2003/0235688 A1 | 12/2003 | Mizukami |
| 2004/0012114 A1 | 1/2004 | Eyerer |
| 2006/0006564 A1 | 1/2006 | Maldas et al. |
| 2006/0145384 A1 | 7/2006 | Singer |

FOREIGN PATENT DOCUMENTS

| CA | 1036356 | 8/1978 |
| EP | 0 226 170 | 6/1987 |
| EP | 0 537 110 | 4/1993 |
| EP | 0 610 619 | 8/1994 |
| EP | 0 747 419 | 12/1996 |
| EP | 0 781 806 | 7/1997 |

(Continued)

OTHER PUBLICATIONS

Chahyadi et al. "Wood Floor/Polypropylene Composites: Influence of Maleated Polypropylene and Process and Composition Variables on Mechanical Properties." International Journal Polymeric Materials, Vo. 15, 1991, pp. 21-44.

Garcia et al. "Dimensional Stability of MDF Panels Produced from Fibres Treated with Maleated Polypropylene Wax." Journal Wood Science and Technology, vol. 39, No. 8, Nov. 2005, pp. 630-650.

(Continued)

*Primary Examiner* — Larry W Thrower
(74) *Attorney, Agent, or Firm* — Jacobson Holman, PLLC.

(57) ABSTRACT

A process for producing pellets or granules comprising fibres of a lignocellulousic material, for use as a feedstock in plastics manufacture, conveying in a dry or wet air stream and applying to the fibres a liquid formulation comprising one or more polymers, monomers, or oligomers, forming the fibres into a solid product, and breaking down the solid product to produce said pellets or granules. Typically the conduit conveys the fibres in a plant for manufacture of fibre board.

25 Claims, No Drawings

(56) References Cited

FOREIGN PATENT DOCUMENTS

| EP | 1 468 799 | 10/2004 |
|---|---|---|
| EP | 1 498 241 | 1/2005 |
| GB | 2 278 365 | 11/1994 |
| GB | 1 504 865 | 2/2005 |
| JP | 2-269004 | 11/1990 |
| JP | 04-148904 | 5/1992 |
| JP | 06-278131 | 10/1994 |
| JP | 09-048023 | 2/1997 |
| JP | 09-057743 | 3/1997 |
| JP | 09-183121 | 7/1997 |
| JP | 2000-343527 | 12/2000 |
| JP | 2003-119391 | 4/2003 |
| JP | 2003-340823 | 12/2003 |
| WO | 1998/48992 | 11/1998 |
| WO | 2005/009701 | 2/2005 |

OTHER PUBLICATIONS

Kokta et al. "Composites of Poly(Vinyl Chloride) and Wood Fibers. Part II: Effect of Chemical Treatment." Polymer Composites, vol. 11, No. 2, Apr. 1990, pp. 84-89.

Kokta et al. "Composites of Polyvinyl Chloride—Wood Fibers. Part III: Effect of Silane as Coupling Agent." Journal of Vinyl Technology vol. 12, No. 3, Sep. 1990, pp. 142-153.

Loxton et al. "Resin Distribution in Medium Density Fibreboard. Quantification of UF Resin Distribution on Blowline Blended MDF Fibre and Panels." In Proc. $5^{th}$ Pacific Rim Biobased Composites Symposium, Canberra, Dec. 2000, pp. 234-242.

Maldas et al. "Surface Modification of Wood Fibers Using Maleic Anhydride and Isocyanate as Coating Components and Their Performance in Polystyrene Composistes." Journal Adhesion Science Technology, Vo. 5, No. 9, 1991, pp. 1-14.

North Wood Plastics Inc. www.northwoodplastics.com.

Schut Jan H. "Wood is Good for Compounding, Sheet & Profile." Online article http:www.plasticstechnology.com/articles/199903fa1.html, 1999.

Sears et al. "Reinforcement of Engineering Themoplastics with High Priority Wood Cellulose Fibers." Proc. $6^{th}$ International Conference of Woodfibre Plastics Composites, Forest Products Society, 2001, pp. 27-34.

ASTM D638: Standard Test Method for Tensile Properties of Plastics.

ASTM D790: Standard Test Method for Flexural Properties of Unreinforced and Reinforced Plastics and Electrical Insulating Materials.

Stark. "Effects of Wood Fiber Characteristics on Mechanical Properties of Wood/Polypropylene Composistes." Wood and Fiber Science, vol. 35, No. 2, 2003, pp. 167-174.

Winski. "Feeding Solutions for Wood Plastics Applications," The $6^{th}$ International Conference on Woodfiber—Plastic Composites, pp. 137-148.

International Search Report, dated Sep. 21, 2005.

METHOD FOR PRODUCING WOOD FIBRE PELLETS

FIELD OF INVENTION

The invention relates to a process for producing pellets or granules comprising fibres of a lignocellulosic material or natural fibres, for use as a feedstock in plastics manufacture.

BACKGROUND

The combining of cellulose-based materials to plastics was originally developed over 25 years ago by extrusion machinery manufacturer ICMA San Giorgio[1] and used by G.O.R. Applicazioni Speciali SpA to make door panels for FIAT cars. The materials for this process were pre-mixed and cram-fed.

Specialist machines have recently been developed in the composite market to produce window and door profiles, as well as decking boards, using hardwood and softwood flour. Generally this equipment is based on traditional plastics manufacturing technologies including extrusion and injection moulding. The plastics used include polypropylene (PP), polyethylene (PE) and poly-vinyl-chloride (PVC) and the fillers used include wood flour, flax, jute and other cellulose-based fibre fillers. The more cellulose-based material that is added to the plastic, often the lower the price and, often, the higher the stiffness of the wood-plastic "raw" material. The composite products made from these wood-plastics can generally be nailed, painted and otherwise treated as wood whilst potentially retaining many of the benefits of plastics in the areas of fungal and corrosion resistance.

For some, addition of wood flour has drawbacks in that, compared conventional inorganic fillers for plastics, it is low bulk density and often needs significant pre-drying before or during compounding, which can result in low production rates and high costs. The powdery consistency of such fillers not only results in a messy operation, and may pose potential health risks to those manning the processing. Wood flour (and wood fibre) also tend to cause blocking in addition port or hoppers, bridging or agglomeration due to the material packing together and can be more difficult to convey and feed into an extruder compared to conventional plastic fillers, the inlet of which is typically small relative to the low bulk density of these materials.

A number of commercial enterprises have recognised some of these problems and have developed, for sale, pre-pelletised wood flour for convenient feeding into extruders[2]. Other have patented processes or concepts around production of pellets containing wood flour and thermoplastic material for further processing such as extrusion[3]. Some have compatibilisers or additives to give enhanced properties[4], with most still focused on wood flour.

Wood flour is a finely ground wood cellulose. When the particle size is above 20 mesh or below 850 microns, the product generally is considered to be wood flour. Mesh size is the measurement of number of openings in a screen per linear inch. The collected wood flour from various sources (sawdust, planar shavings, sanding dust and scraps) are hammer milled to form very fine powder, classified by the standard mesh size that it can pass through. Most wood-filled thermoplastic manufacturers specify flour in the 30-80 mesh range. Bulk density of wood flour is relatively higher compared to wood fibres. The moisture content of wood has a significant effect on the processing and final composite product quality. Pre-drying the wood flour to less than 1% moisture content is usually desirable. Wood flour with less moisture content is less likely to burn during compounding with thermoplastics. The particle size for other natural fibres/fillers such as pine needles, maple, oak, bamboo dust, jute and coir may vary from 10-80 mesh. (From: Thermoplastic Composites—a New Business Avenue, M Suresh Babu. Sangeeta Baksi, G. Srikant & Soumitra Biswas (www.tifac.org.in/news/acthermocomp.htm).

Commercial wood flour often comes in mesh sizes of 20 to 100, but most thermoplastic applications are in the 30 or 40 mesh to 80 mesh range. Wood "fibre" is, strictly speaking, not the same as wood flour though, confusingly, the term "fibre" is used interchangeably for flours. Wood fibre, as opposed to wood flour, will typically be longer fibre-like rather than particle-like (flour) and may typically have average lengths of >0.85 mm, and more usually >1 mm, and perhaps in the 2-3 mm range. Some powder (fines) may be present in the fibre products, but they are usually minor components and average lengths are thus greater in fibre rather than flour. In addition, often, fibre is more entangled or fluffy, of lower bulk density, and difficult to handle. The aspect ratio (length÷diameter) of, for example, wood fibres may be >10:1 and may typically be, for example, of the order of 20:1, 25:1 or 40:1, 50:1, 70:1 or more, while "flour" may generally have aspect ratios of 1:1 to 4:1 or 5:1, and typically less than 8:1 or 10:1. Some wood flour is pulverized flour as fine as 200 mesh. There may be exceptions, but flour is generally a powdery product and fibre a longer fibrous-like material. Wood flour adds some stiffness to plastics but can reduce strength and/or impact strength. However, the longer, higher aspect ratio, wood fibres contribute more to either or both stiffness and strength, compared to wood flour, while being lighter than many synthetic fibres. However, wood fibres are more difficult to blend and bind into the plastic-composites. The performance advantages of using wood fibres instead of wood flour have been recognised[5] but attempts to produce special equipment to handle wood fibre to compound with a plastic have met with limited success. Special fibre feeders or 'stuffers' or 'crammers' are available but are often expensive and not reliable over a wide range of metering for end compositions since, for example, some applications may require <10 wt % fibres while others may require more than this and indeed >50 wt %. Mechanical properties including creep resistance have the potential to be improved by use of longer fibres compared to flours or powder fillers.

The introduction of low bulk density natural or wood fibres into extruders or injection moulders or other plastics processing machinery, in particular in a metered or measured way, which is important to achieve desired fibre volume fractions in compositions, has a number of difficulties. Thus, it is not straightforward, due to the inherent high volume/low mass nature of such fibres, the lack of free flowing characteristics in such fibres, and the fibre bundling or entanglements, to achieve controlled feeding directly into port holes or orifices of plastics processing machinery. Although some fibre—feeders exist they are either expensive and/or unreliable or inaccurate in metering uniformly over a wide range of fibre feed ratios with wood and other natural fibres. In addition, it is necessary to pre-dry a high volume-low mass of fibre before such feeding/use since such fibres are hygroscopic and retain, or reabsorb, high levels of water, which is usually undesired and required to be substantially removed prior to the plastic processing. (See, for a review of fibre feeders, John Winski, "Feeding Solutions for Wood Plastics Applications", The 6th International Conference on Wood-fiber—Plastic Composites, p137-148). Thus, the processing and handling issues mentioned above associated with wood flour are much worse when one wishes to consider use of wood fibre. Hence, if a convenient and low cost method for the manufacture of wood fibre pellets existed this would be a breakthrough for wood fibre utilisation in plastics. Such products with suitable performance and/or convenient, cost-effective, methods for their manufacture, are not well know n or established. Feeding or metered additions of pellets into extruders etc is much more convenient.

Medium density fibreboard (MDF) uses a high temperature thermomechanical pulp fibre to produce large panels for a variety of applications, such as furniture or internal mouldings. Due to the commercial scale of these operations and the use of heat to soften the fibres, MDF fibre is a low cost form of wood fibre. Additionally, it has an aspect ratio to allow reinforcing of composites (for example radiata pine approx 2.5 mm×30 µm). In the MDF process a thermosetting resin, typically urea-formaldehyde (UF) or related formaldehyde crosslinking resins, or other resins such as isocyanate resins, is added to the fibre, with the fibre in a wet state, while it is exiting the refiner in the blowline. This gives extremely high surface coverage of the fibre at low resin loadings[6]. The MDF process would not be usually associated with producing a thermoplastic precursor for further processing in extrusion or other thermoplastic operations. Ordinarily it produces a sheet product which is fibre-rich and bound with a rigid, cured, thermoset resin which is not readily thermoplastically processable or reprocessable or easily usable or useful in thermoplastic processes.

Plastic and wood, or plastic and natural fibres, do not mix easily, although some polymers are more compatible than others are. PVC, which is polar like wood, reportedly bonds to, or interacts well with, the filler or fibre without special alloying or coupling agents, whereas polyolefins (polypropylene and polyethylene) do not adhere to wood as well as PVC, and so such wood-plastics require modification to get the best level of performance from the filler or fibre in the plastic. One example of the current state of technology is to add a coupling agent, often a maleated polyolefin for polyolefin based composites, into the extruder and mixing within the extruder. The prior art contains numerous suggestions regarding polymer fibre composites. Gaylord, U.S. Pat. Nos. 3,765,934, 3,869,432, 3,894,975, 3,900,685, 3,958,069 and Casper et al., U.S. Pat. No. 4,051,214 teach a bulk polymerization that occurs in situ between styrene and maleic anhydride monomer combined with wood fibre to prepare a polymer fibre composite. Segaud, U.S. Pat. No. 4,528,303 teaches a composite composition containing a polymer, a reinforcing mineral filler and a coupling agent that increases the compatibility between the filler and the polymer. The prior art also recognizes modifying the fibre component of a composite. Hamed, U.S. Pat. No. 3,943,079 teaches subjecting unregenerated discontinuous cellulose fibre to a shearing force in shear mixers, resulting in mixing of a polymer and a lubricant material with the fibre. Such processing improves fibre separation and prevents agglomeration. Similarly, Coran et al., U.S. Pat. No. 4,414,267 teaches a treatment of fibre with an aqueous dispersion of a vinyl chloride polymer and a plasticizer, the resulting fibres contain a coating of polyvinyl chloride and plasticizer and can be incorporated into the polymer matrix with reduced mixing energy. Beshay, U.S. Pat. Nos. 4,717,742 and 4,820,749 teach a composite material containing a cellulose having grafted silane groups. Raj et al., U.S. Pat. No. 5,120,776 teach cellulosic fibres pre-treated with maleic or phthalic anhydride to improve the bonding and dispersibility of the fibre in the polymer matrix. Raj et al. teach a high density polyethylene chemical treated pulp composite. Hon. U.S. Pat. No. 5,288,772 discloses fibre reinforced thermoplastic made with a moisture pre-treated cellulosic material such as discarded newspapers having a lignant content. Kokta et al., "Composites of Poly(Vinyl Chloride) and Wood Fibres. Part II. Effect of Chemical Treatment", Polymer Composites. April 1990, Volume 11, No. 2, teach a variety of cellulose treatments. The treatments include latex coating, grafting with vinyl monomers, grafting with acids or anhydrides, grafting with coupling agents such as maleic anhydride, abietic acid (See also Kokta. U.K. Application No. 2,192, 397). Beshay, U.S. Pat. No. 5,153,241 teaches composite materials including a modified cellulose. The cellulose is modified with an organo titanium coupling agent which reacts with and reinforces the polymer phase. Maldas and Kokta, "Surface modification of wood fibres using maleic anhydride and isocyanate as coating components and their performance in polystyrene composites", Journal Adhesion Science Technology, 1991, pp. 1-14 show polystyrene flour composites containing a maleic anhydride modified wood flour. A number of publications including Kokta et al., "Composites of Polyvinyl Chloride-Wood Fibres. III: Effect of Silane as Coupling Agent". Journal of Vinyl Technology, Vol. 12. No. 3, September 1990, pp. 142-153 disclose modified polymer (other references disclosed modified fibre) in highly plasticized thermoplastic composites. Additionally, Chahyadi et al., "Wood Flour/Polypropylene Composites: Influence of Maleated Polypropylene and Process and Composition Variables on Mechanical Properties", International Journal Polymeric Materials, Volume 15, 1991, pp. 21-44 discuss polypropylene composites having polymer backbone modified with maleic anhydride.

Although many publications refer to wood fibres, in reality they are essentially wood flour or powders, or flakes, or saw-dust etc rather than fibres with a reasonable aspect ratio (10:1 or 20:1 or more, etc as described above), for example typically of average length 1 mm or more. Flour and related materials are easier to handle and process and feed into typical plastics machinery, whereas the longer fibres tend to be entangled and fluffed and much more difficult to feed into plastics machinery in a metered way.

Accordingly, a substantial need exists for improved processes to introduce wood or other natural fibres, for example with an aspect ratio greater than 10:1 or 20:1 or with an average fibre length of, say, 0.8 mm or 0.9 mm or 1 mm or more (as opposed to wood flour or powders or flakes) into plastics processing machinery, and, also, for compatibilising formulations or materials for combining thermoplastic polymer(s) and wood or natural fibre(s).

In other prior art, Sears et al (9) describes use of fibres with an alpha cellulose content purity >80% indicative of pulps which are usually kraft or chemically pulped and not ordinarily available or manufactured by an MDF type process ie via mechanical or thermomechanical pulping methods such as used in the present invention. Fibre pellets with wet pulp cellulosic fibres can be manufactured in other ways such as use of granluated pulps impregnated with binders, which will often reduce fibre lengths and aspect ratios and result in a product which is similar to the use of wood flour, or via use of mixers in which fibres and aqueous, dissolved, binders are premixed (eg in Hobart or similar mixer) in a water medium, and then pelltised wet, via special pellet mills (eg Kahl Pellet Mill). Such methods are described by Sears et al (9). These approaches will not be as convenient as the present invention in that significant drying and densification of the wet impregnated pulps is required prior to eventual introduction to plastics and the process or products are unlikely to be as cost-effective as an MDF manufacturing approach, and the fibre products produced therein. In addition, the use of blowline or related processes which use moving air or steam carried fibre streams and polymer solutions or dispersions applied therein, coat the fibres with a well or highly dispersed polymer coverage on the fibre surface in highly efficient manner with efficient usage of polymer. Furthermore the use of the MDF and related processes are well suited to low cost continuous manufacturing processes.

OBJECT OF THE INVENTION

It is an object of the invention to provide an improved, or at least an alternative process or method to introduce wood fibre or other lignocellulosic or natural fibre, into plastics and for subsequent utilisation in plastics processing machinery.

SUMMARY OF THE INVENTION

In broad terms in one aspect the invention comprises a process for producing pellets or granules (as herein defined) comprising fibres of a lignocellulosic material or natural fibres, for use as a feedstock in plastics manufacture, which comprises:
conveying loose or divided fibres or fibre bundles, produced by mechanically or thermomechanically or chemo-thermomechanically or chemo-mechanically breaking down a lignocellulosic material, or natural fibres, in a dry or wet air stream and applying to the fibres while so conveying the fibres a liquid formulation comprising one or more polymers, monomers, or oligomers,
forming the fibres into a solid product, and
breaking down the solid product to produce said pellets or granules.

Preferably the process includes conveying the fibres along a conduit in a dry
or wet stream and introducing the formulation of the polymer, monomer or oligomer into the interior of the conduit to apply the formulation to the fibres while the fibres are moving through the conduit.

Preferably the process includes introducing the formulation into the conduit by spraying the formulation into the interior of the conduit as the fibres move through the conduit, to coat or partially coat the fibres.

Preferably the conduit conveys the fibres from a refiner stage in a plant for manufacture of fibre board.

Preferably the conduit conveys the fibres to or from a drying stage or drier.

Preferably the process includes forming the fibres into a solid product by pressing the fibres to a solid product in planar form.

Preferably the process includes pressing the fibres between heated plattens.

Preferably the process includes pressing the fibres into a sheet of up to about 2 cm in thickness, more preferably up to about 1 cm in thickness.

Preferably the process includes breaking down said solid product to said pellets or granules by cutting or sawing the solid product.

Preferably the fibres have an average fibre length or fibre-bundle length of at least about 0.8 mm, more preferably at least about 1 mm.

Preferably a major fraction of the fibres have an aspect ratio of at least 10:1, more preferably at least 20:1, and most preferably at least 25:1.

Preferably the process includes breaking down the solid product to produce pellets which are longer than the average fibre length of the fibres within the pellets.

Preferably the pellets or granules comprise between 0.3 to 25 parts of the polymer per 100 parts of fibre by dried weights.

Preferably the liquid formulation is an aqueous solution, dispersion or emulsion.

Preferably the formulation comprise(s) a thermoplastic polymer having a melting point below 230° C., or below 200° C.

Preferably the polymer is a polyvinyl alcohol, polyvinyl acetate, polyester, starch based, or a polymer or copolymer with one or more of an acid, anhydride, epoxy, amine, isocyanate, silane, or silanol group.

In a further aspect the invention comprises a process for producing pellets or granules (as herein defined) comprising fibres of a lignocellulosic material or natural fibres, for use as a feedstock in plastics manufacture, which comprises:
conveying loose or divided fibres or fibre bundles, produced by mechanically or thermomechanically or chemo-thermomechanically or chemo-mechanically breaking down a lignocellulosic material, or natural fibres, along a conduit in a dry or wet air stream,
applying to the fibres a liquid formulation comprising one or more polymers, monomers, or oligomers, by spraying the formulation onto the fibres to coat or partially coat the fibres,
forming the fibres into a solid product, and
breaking down the solid product to produce said pellets or granules.

In a further aspect the invention comprises process for producing pellets or granules (as herein defined) comprising wood fibres, for use as a feedstock in plastics manufacture, which comprises applying to wood fibres or fibre bundles, produced by mechanically or thermomechanically or chemo-thermomechanically or chemo-mechanically breaking down solid wood, a liquid formulation comprising one or more polymers, monomers, or oligomers to coat or partially coat the fibres, pressing the fibres into a solid product, and breaking down the solid product into wood fibre-containing pellets or granules.

The terms pellets or granules is intended to exclude powders and include larger particles comprising whole fibres, that are free flowing.

The term 'comprising' as used in this specification and claims means 'consisting at least in part of', that is to say when interrupting independent claims including that term, the features prefaced by that term in each claim will need to be present but other features can also be present.

Typically the invention provides a process of impregnating or coating or binding wood and other natural fibres, such as cellulose based fibres, with a dispersed or dissolved polymer system ('binder'), then pressing or consolidating the impregnated fibres under pressure, and preferably at elevated temperature, into sheet or mat wherein the fibres are held together largely by the binder and then chopping the sheets into feedstock pellets or fibre concentrates.

In general the invention relates to a process or method for the manufacture of pre-coated or impregnated wood or other natural fibre composite feedstocks, such as pellets, or masterbatch compounds, useful in thermoplastic processes. In particular, the invention describes a method for producing wood or other natural fibre compounds or pellets, using fibres such as obtained from a thermo-mechanical pulping process, during, or after, which the fibres are treated with a coating or binder system, applied via a solution or dispersion or powder dispersion to a flowing or moving fibre stream, in air or steam, such as in a blowline. Such coating or binder holds the fibres together when formed or pressed or heated into a profile or sheet or other shape, and when such pressings or shapes are chopped or comminuted into, for example, pellets, and the binder or coating which will also still allow subsequent convenient feeding into, and processing in, plastic processes and machinery and mixing or moulding with other plastic materials. The process may also include pre-coating or partially pre-coating or pre-compatibilising wood or other natural fibres, or introducing other functional materials on, in, or close to, such fibres, which can then be processed into a convenient pellet or feedstock for use in plastic processing, and blending with plastics and other materials, especially in thermoplastic processes such as extrusion or injection moulding.

The invention provides a method for producing wood fibre pellets in a suitable form for feeding into thermoplastic processing equipment, such as extruders or injection moulders. Preferably thermomechanical or thermo-mechanically refined pulp or chemo-mechanical pulp, or chemo-thermo-mechanical pulp, wherein optional pre-digestion of fibres or chips can occur before entering the fibre refiner, is used as the fibre. More preferably high temperature thermomechanical pulp, such as medium density fibreboard fibre (MDF) is used. Thus, one embodiment of this invention uses modified MDF (medium density fibre board) processes to overcome the difficulties and issues highlighted above in fibre-feeding, fibre-drying and fibre-plastic compatibility.

In one embodiment, the fibre has a binder added in the blowline or other facility for spraying or distributing polymer dispersions or solutions onto fibres. Preferably, the binder is a thermoplastic polymer, or comprises a thermoplastic polymer as one component. However, thermoset or mixed polymer systems are also possible. Preferably, the binder is in aqueous solution or an emulsified or aqueous polymer dispersion or a formulation of ingredients which is a dispersion, emulsion or solution or a neat liquid. Any polymer which can be dissolved or dispersed in water, or modified or formulated to form or be part of a stable dispersion, or polymerisable resin system, in water may be used. Alternative solutes or dispersion media may be used such as alcohols or other organic solvents, but water is the preferred medium, either alone or in admixture with other co-solvents. Latexes may be used. Dry or neat polymer powders may also be used under varying conditions and low melting waxes or polymers or blends, as high or 100% solids, may also be used according to viscosity and tack requirements of the application apparatus such as spray gun/nozzle. Heated tubing and heated nozzles may be used to aid introduction of such materials.

The polymer or additives can be added in the refiner or in the bowline or in the drier or at any point, prior to or after any of these stages in the tubes or pipes or drums or other vessels which convey or transfer fibre continuously in the process. The polymer/additives may be applied to wet fibres or dried fibres or to fibres with equilibrium or near equilibrium moisture content (EMC, typically of the order of 12 wt % moisture). The polymer coating is added to the flowing fibre, stream, which may contain bundles or fines, and which are entrained in air or high humidity air, at any point of the MDF process, or related fibre-refining-impregnation manufacturing processes.

Preferred polymers for the binder are polymers which can be processed as a thermoplastic substance or elastomers and are herein classified as thermoplastic substances and constitute a preferred subclass of plastic polymers. Additionally thermoset resin may be used as binder. Examples of elastomers suitable for the preparation of concentrates of this invention are natural rubber, styrene-butadiene rubber (SBR), ethylenepropylene rubber (EPR), ethylenepropylene terpolymer (EPDM), acrylonitrile butadiene rubber (NBR), ethylene-vinylacetate copolymer, silicone rubber, polybutadiene rubber, cis-polybutadiene, trans-polybutadiene, neoprene, polyisoprene and butyl rubber, sulfur-vulcanizable diene rubbers. Diene rubber includes rubber of both low and high unsaturation, the unsaturation being either in a side chain or in the backbone of the polymer and either conjugated or non-conjugated. Examples of other suitable polymers include acrylate polymers, urethane polymers, chlorosulfonated polyethylene, polyvinyl chloride, halogenated polyethylene, polystyrene, polyvinyl acetate, polyvinyl alcohol, polyvinyl pyrrolidone, acrylonitrile butadiene-styrene terpolymers (ABS), styrene-maleic anhydride copolymers and esterified or other derivatives, polyamides, polyesters, or copolymers of vinyl acetate, copolymers of olefins (ethylene, propylene) with unsaturated acids such as acrylic or methacrylic acid or maleic anhydride or with vinyl alcohol or vinyl esters, polyvinyl ethers and copolymers of vinyl ethers, starches and starch derivatives, polycaprolactone, polylactic acid, polyhydroxyalkanoates, proteins, polyacids, polyanhydrides, polyisocyanates, polyols/polyethers, and copolymers or terpolymers and the like, containing the monomers of such polymers. Mixtures comprising one or more of the above are also suitable. Other oligomeric or reactive resin systems such as epoxy resins, acrylics, unsaturated polyesters, urethane/isocyanate resins, formaldehyde cure resins such as urea-formaldehydes, melamine-formaldehyde, phenol-resorcinol resins, phenolic resins, and related or hybrid systems may also be used. In the process of the invention, resins such as those above or others may be formulated and used as the polymer and/or additives. Thus the added polymer(s) or additives may include reactive monomers or oligomers with reactive groups, applied as aqueous dispersions, emulsions or as neat liquids or molten media.

In a preferred embodiment the binder may also act as a compatibiliser for the fibre and bulk matrix plastic in the end composite, and, thus, the present invention allows a compatibiliser to be added to the fibre and binder in the blowline to afford greater bonding between polymers and wood fibre. The compatibiliser can be any of the polymers above or their mixtures or blends and can be, or contain, other added materials also. It may be a formulated or reactive polymer system. For polyolefin matrix end composites it is preferably a maleated or acid functional copolymer, such as maleated polyproplyene. Preferably the compatibiliser is an emulsified or dispersed polymer or one dissolved in water.

Although in principle any fibre or filler can be used in the invention the advantages are most evident with fibres or other fillers which are difficult to feed into plastics processing, or other, machinery in their individual, separated, loose, normal or other readily available forms. In particular cellulosic or ligno-cellulosic fibres are preferred especially from natural origins such as wood (all types), plant or crop fibres (hemp, straw, wheat, flax, NZ flax, corn, coconut, grasses, kenaf, jute, sisal, ramie, kudzu, . . . ) and animal fibres such as wool/keratin, other protein fibres. Often such fibres have low bulk densities and are entangled or curled fibre bundles difficult to flow or feed into small orifices and to convey in metered way into extruders etc.

Thus the present invention provides a solid panel, sheet or profile by compacting, for example with heat and pressure in a press, the fibre wetted with added polymer. Preferably a hot press is used to compress the fibre into a solid panel or sheet. The panel can then be comminuted into pellets producing pre-compatibilised fibre concentrates which can then be readily fed and metered into extruders or other plastics processing machinery, usually with pre-drying. In one example of the invention pellets containing wood fibre and polymer(s) can be prepared for example by cutting or slicing the consolidated form resulting from pressing.

Although the present invention is broadly as defined above, those persons skilled in the art will appreciate that the invention is not limited to it and that the invention also includes embodiments of which the following description gives examples.

The present invention is broadly directed to wood plastic composites (WPCs) and other natural fibre plastic composites, and preparation of raw materials for eventual use in processing equipment such as plastic extruders or injection moulders and related equipment.

Accordingly, in one aspect, the invention provides a method of producing and compressing wood or natural or plant fibre into a form suitable for introduction into plastics processing equipment, such as an extruder. The invention uses a press, for example a traditional MDF process or other refining process, to produce wood fibre from wood or natural plant fibre from plants, and then apply additives in the blowline or refiner and related processes. The fibre-additive blend is dried and formed into a mat before pressing in a tradition MDF press to produce sheets. The sheets are subsequently reduced to concentrates, agglomerates, particles, tapes or pellets that can be fed into plastics processing equipment. For example the sheets can be slit and pelletised with pellet lengths of any desired length according to the chopping length set and the initial pressed sheet dimensions. Preferably the pellet length will be longer than fibre length. For example 2 mm, 3 mm or 4 mm or 5 mm or 6 mm or longer may be used.

To allow the MDF fibre to remain consolidated after pressing, a binder is added, for example into the blowline, shortly after fibres are formed in the process. Alternatively the fibres may be collected from the refining process and subsequently turbulently reflowed in a stream, then sprayed or impregnated with binder polymer solution or dispersion. The binder needs to have sufficient strength to hold the fibres in a sheet and in a solid pellet, when pelletised. Preferably, though not essentially, the binder should have a glass transition, melt, dissociation, softening or degradation temperature such that fibres are allowed to become mobile in the plastics processing equipment, such as in the barrel of an extruder, and form a uniform blend with the thermoplastic material it is being blended with. The binding polymer can be added at low loadings solids on fibre, and not cause compatibility problems with the final polymer it is to be combined with. Preferentially the binder will act to improve compatibility between the fibre and bulk plastic matrix. Thus, a further aspect to the invention is the addition of compatibilisers in the blowline, designed to improve the compatibility and binding between wood or other fibres and the thermoplastic matrix the fibre will eventually be blended with. Blending polymers with fibres in a MDF blowline gives better surface coverage of fibres than blending dry fibres with polymer at ambient conditions. As the blowline operates at elevated temperatures and moisture contents, it is preferable that the compatibiliser is in the form of an emulsion or dispersion in water. Neat liquids or low melting solids eg waxes may also be used if able to be sprayed into fine particles. Preferentially the binder coated fibres are pressed under heat to form a sheet with sufficient integrity to withstand slitting and pelletisation processes. This may also impart or retain intimate mixing, contact or bonding of the binder/compatibiliser with fibre and/or remove some of the moisture.

The process may typically be performed in many conventional MDF or particleboard mills wherein fibres are refined and impregnated in blowline or similar facilities, pressed under heat, but, in the process of the invention, then slitted and chopped into pellets and, preferentially, the binder resin is a resin system which is compatible with the ultimate thermoplastic matrix of choice and processable in plastics machinery such as extrusion or injection moulding. Thus, it is feasible that conventional MDF or similar mills, or their products, could be adapted to produce fibre concentrates for plastics extrusion or injection moulding or other moulding processes, to make fibre-plastic composites. The binder or fibre pre-coating composition may be a formulation of one or more polymers and may also comprise other additives such as stabilisers, plasticisers, process aids, flame retardants, adhesion promoters, colourants, lubricants, antistatic agents, bioactives, liquid additives or solids difficult to introduce into the extruder or required at low levels overall and may also include reactive or functional resins such as epoxy resins.

The pressing of the intermediate sheets can be carried out according to a range of sheet densities. The pelletisation of such sheets can be carried out by a variety of methods and a range of pellet lengths and dimensions and shapes can be used. Pre-patterning or imprinting of the sheets can be carried during or after sheet manufacture out to aid the subsequent pellet manufacture.

When mixing the fibre-rich pellets with plastic pellets and/or other additives in an extruder various combinations of mixing approaches and relative positions of introduction are feasible.

The fibre pellet may be added directly to an injection moulding machine, with added plastic pellets.

The examples below illustrate the invention, though they are not to be considered in any way limiting and modifications can be made with respect to the invention by one of ordinary skill in the art.

EXAMPLE 1

PVA Bonded MDF Fibre Pellets and Reference (Wood Flour) Pellets

Polypropylene (PP) was extruded with radiata pine MDF fibres and then injection moulded to form test specimens. Wood flour and sander dust are used as references, as examples of wood derived fillers conventionally used in industry and reasonably easy to feed in as particulate products compared to a fibre product. Their performance levels, in the composite, are representative of industry or existing norms for compounded or moulded wood reinforced plastics and is included here to demonstrate that performance is not compromised by the utilisation of the fibre materials and processes of the invention. Fibre products are expected to be at least equal to the flour products and superior to them in some properties, as reinforcement, though, direct utilisation of loose low density or entangled fibres is difficult in the feeding into extruders and other machinery in a controlled or measured way. Tensile, flexural and resistance to impact properties of the MDF fibre-reinforced composite materials were determined as a function of fibre content and processing parameters and compared with flour products to ensure properties are not compromised by using the methods of the invention to introduce fibres rather than flour.

Materials

The MDF fibre used was produced at the New Zealand Forest Research PAPRO pilot plant refiner from *Pinus Radiata* toplog using processing conditions to mimic commercial MDF fibre. The fibre was air dried to approximately 10-15% moisture content before storage in plastic bags. Sander dust (SD) was supplied from local saw-mills. The PVA (polyvinyl acetate) resin used was National Starch & Chemical (NZ) Limited Korlok 442.3060.05. The polypropylene pellets used were Hyundai Seetec grade M1600 with a melt index of 25.

Sample Production

PVA bonded MDF 2 mm panels were produced by spraying 80-100 grams of PVA resin onto 550 grams of fibre using the 500F MDF laboratory blender (Maxiblender), which uses air pressure to reproduce air turbulence, as in a blowline and blows fibres around or along a certain path, with resin application occurring via a nozzle or spray gun, forcing resin into the flowing fibre stream. 100 grams resinated fibre was then formed into a 255 mm×280 mm×2 mm (700 kg/m$^3$) panel or sheet, akin to MDF manufacturing. The PVA bonded panels were cut into pieces approximately 5 mm square, and such concentrates or pellets were desiccant dried under vacuum. The wood flour was dried at 80° C. for 24 hours. The polypropylene pellets were used as received without further drying. The PVA bonded wood fibre and polypropylene pellets were mixed in an OMC 19/30 twin screw co-rotating extruder (19 mm screw, L:D 30).

The PVA/MDF fibre pellets were fed using a hopper and the polypropylene was fed using a screw feed with extruder zone temperatures set as indicated in Table 1, though the pellets could be fed via a conventional feeder also.

TABLE 1

Extrusion conditions

| Sample | Zone 4 (° C.) | Zone 3 (° C.) | Zone 2 (° C.) | Zone 1 (° C.) | screw speed (rpm) |
| --- | --- | --- | --- | --- | --- |
| all | 180 | 180 | 170 | 160 | 200 |

The fibre pellets may be combined with plastics and other additives in numerous ways, according to common extrusion compounding practices and using metered feeders etc.

Examples of variations demonstrated in this set of examples which illustrate some options, but without limiting use of other approaches, were:

PM=fibre-pellets/PP pellets pre-mixed or introduced at the same port on the extruder
D=dual feed, fibre pellets in first port/PP pellets in second port
F=dual feed, PP fibres in first port/fibre pellets in second port
SD=wood flour (sander dust)/PP pellets pre-mixed or introduced at the same port on the extruder (reference).

The wood flour was compounded by pre-mixing with polypropylene before introduction into the first extruder feed throat using a U-shaped hopper.

The mixtures were extruded through a die, which formed a 3 mm-diameter strand which was then pelletised. When problems occurred cutting the PP/wood flour strand during pelletising, the wood fibre/flour polypropylene mixtures were Wiley milled through a 4 mm mesh. The same approach was also used for the wood-fibre pellets for comparisons. The following wood fibre (PM, D, F) and wood flour (sander dust—SD)/polypropylene mixtures were compounded as examples:

PM with 20% and 40% wood fibre (by weight)
D with 20%, 40%6 and 60% wood fibre
F with 25%, 30%, 40% and 60% wood fibre
SD with 20%, 40% and 60% sander dust/wood flour (reference)

The compounded "pellets" were re-dried at 60° C. for 2-3 days before injection moulding. The dry pellets were injection moulded using a Boy 15S injection moulder (28 mm screw, 20:1 L:D), using processing conditions with a screw speed of 150 rpm, barrel temperatures in the range 190-230 C, and tool temperature set at ambient.

Mechanical Property Testing

Samples were conditioned at 23° C. and 50% RH for 2 weeks before measurement and testing.

Tensile properties were evaluated according to ASTM D638-96 (Type I)[7]. The specimens were a dog bone shape, with the narrow test section having a nominal width of 13 mm and nominal thickness of 3.2 mm. An Instron model 5567 test machine was used for testing, equipped with a 10 kN load cell and 25 mm extensometer. The initial separation between grips was 100 mm, with a testing speed of 5 mm/min.

Flexural properties were evaluated according to ASTM D790-96a[8], except that the loading nose and supports had radii of 7.5 mm. The specimens were a rectangular shape, with a nominal width of 13 mm and nominal thickness of 3.2 mm. An Instron model 5567 test machine was used for testing, equipped with a 10 kN load cell. A span of 50 mm and speed of 1.3 mm/min was used for flexural tests.

Impact properties were evaluated according to ASTM D256-93a (Test Method B-Charpy). The specimens were a rectangular shape, with a nominal width of 13 mm and nominal thickness of 3.2 mm. A CEAST 6545/000 test instrument with supports 95.3 mm apart was used for testing, using a 0.5 J hammer.

Tensile Properties

The tensile test results are presented below in Table 2.

TABLE 2

Tensile test results

| Sample | Fibre/Filler | Tensile Modulus (GPa) | Ultimate Stress (MPa) | Strain at Break (%) | Stress at Yield (MPa) | Strain at Yield (%) |
| --- | --- | --- | --- | --- | --- | --- |
| PP | None | 1.39 | 25.2 | 40.9 | 13.6 | 1.09 |
| M-PVA-20PM | MDF bonded | 2.18 | 20.8 | 8.07 | 12.7 | 0.68 |
| M-PVA-40PM | MDF bonded | 2.50 | 21.1 | 4.57 | 13.4 | 0.63 |
| M-PVA-20D | MDF bonded | 2.97 | 20.9 | 4.76 | 12.3 | 0.49 |
| M-PVA-40D | MDF bonded | 4.21 | 20.8 | 3.16 | 13.3 | 0.36 |
| M-PVA-60D | MDF bonded | 8.71 | 17.8 | 0.36 | 7.9 | 0.14 |
| M-PVA-25F | MDF bonded | 2.46 | 21.5 | 4.25 | 13.7 | 0.66 |
| M-PVA-30F | MDF bonded | 3.45 | 22.2 | 3.52 | 12.5 | 0.46 |
| M-PVA-40F | MDF bonded | 4.60 | 24.2 | 3.12 | 10.2 | 0.26 |
| 20SD | Sander dust | 1.97 | 21.6 | 5.79 | 12.6 | 0.73 |
| 40SD | Sander dust | 3.41 | 20.5 | 2.97 | 17.5 | 0.43 |

PM = premixed PP with 20% and 40% wood fibre (both at start hopper, first port)
D = PP fed separately with 20%, 40% and 60% wood fibre (in first port, PP in second)
F = PP fed separately with 25%, 30%, 40% and 60% wood fibre (second port, PP in first port)
SD with 20%, 40% and 60% sander dust (reference - fed premixed at start hopper/first port)

All filled polypropylenes had a significantly higher modulus with fibre usually higher than the wood powder (SD) reference. Tensile strengths for all composites were all lower than neat PP (polypropylene) which is indicative of poor fibre-polymer compatibility. However, the main advantage here was to provide a convenient method to introduce low bulk density fibres into an extruder or moulding machine using conventional feeders or approaches rather than special fibre stuffers or feeders. It is much easier to feed in pellets cut from pressed sheets rather than the loose fibres or highly fluffy fibre bundles. Indeed, the use of pellet feedstocks are preferred to using powders and fine particles. The examples above showed that pressed bound fibres even with thermoset PVA adhesive can be used as a feedstock pellet for thermoplastic processes such as extrusion or injection moulding and achieve performance equal or superior to the powder reference.

Flexural Properties

The flexural test results are presented below. The polypropylene control, 20% pre-mix and 20% sander dust samples did not break before they reached 5% strain, which is the limit of the ASTM test method. The stress values given are at 5% strain. Beyond this point these specimens still showed an increasing load.

TABLE 3

Flexural test results

| Sample | Flexural Modulus (GPa) | Stress at Break (MPa) | Stain at Break (%) | Stress at Yield (MPa) | Strain at Yield (%) |
|---|---|---|---|---|---|
| PP | 1.05 | 33.8* | 5.00** | 20.9 | 2.20 |
| 20PM | 1.98 | 39.0* | 5.00** | 21.7 | 1.23 |
| 40PM | 2.37 | 39.1 | 3.86 | 19.4 | 1.05 |
| 20D | 2.57 | 38.9 | 3.54 | 24.0 | 1.13 |
| 40D | 4.04 | 39.8 | 1.57 | 31.0 | 0.90 |
| 60D | 5.28 | 38.1 | 0.92 | 32.4 | 0.67 |
| 25F | 2.14 | 38.8 | 3.87 | 23.6 | 1.21 |
| 30F | 2.81 | 40.3 | 2.54 | 26.5 | 1.04 |
| 40F | 3.75 | 44.3 | 1.92 | 29.7 | 0.87 |
| 60F | 4.61 | 34.0 | 1.06 | 28.8 | 0.81 |
| 20SD | 1.95 | 41.2* | 5.00** | 23.3 | 1.41 |
| 40SD | 3.14 | 40.8 | 2.39 | 28.4 | 1.06 |
| 60SD | 4.19 | 33.1 | 1.29 | 25.3 | 0.68 |

PP = neat polymer
SD = sander dust.
All others = PVA-MDF fibre pellets.
*samples did not break before 5% strain, values given are for stress at 5% strain
**samples did not break before 5% strain Most of the filled polypropylenes had higher flexural strengths than the polypropylene control with the materials made from pellets cut from pressed PVA-fibre sheets showing better performance than wood flour or sander dust (SD) references.

Impact Properties

The Table below shows that the fibre, as introduced by the methods of the invention, demonstrates higher impact performance than the powder samples (SD) at equivalent loadings.

TABLE 4

Impact test results

| Sample | Impact Strength (J/m) |
|---|---|
| PP | 102.50 |
| 20PM | 42.08 |
| 40PM | 43.23 |
| 20D | 45.27 |
| 40D | 45.69 |
| 60D | 30.00 |
| 25F | 40.46 |
| 30F | 41.16 |
| 40F | 53.51 |
| 60F | 31.86 |
| 20SD | 42.46 |
| 40SD | 40.34 |
| 60SD | 26.22 |

EXAMPLE 2

Use of Coupling Agents and Binders in Pre-Pelletised MDF Feed Stock

Polypropylene composites containing natural fibres/fillers were produced by compounding in a twin screw extruder and subsequently injection moulding samples. Fibre (MDF), and wood flour, along with three different coupling agents (polyvinyl acetate, maleic anhydride modified polypropylene emulsion and solid maleic anhydride modified polypropylene) were used.

Materials

The MDF fibre used was produced at the New Zealand Forest Research Institute PAPRO pilot plant refiner from *Pinus Radiata* toplog using processing conditions to mimic commercial MDF fibre. The fibre was air dried to approximately 10-15% moisture content before storage in plastic bags. The wood flour used was standard grade *Pinus Radiata* supplied by Kingsland Seeds.

The polypropylene resin used was Hyundai Séetec grade M1600 supplied as pellets. Zinc stearate powder was AR grade obtained from BDH. The maleic anhydride modified polypropylene (MAPP) emulsion used was Michem 43040 supplied by Michelman Inc. The PVA resin used was National Starch & Chemical (NZ) Limited Korlok grade 442.3060.05. Epolene G3015 (Eastman Chemical Co) was also used as a source of solid MAPP, added into the extruder.

Sample Production

PVA and MAPP (Michem emulsion) bonded MDF 2 mm panels were produced by spraying resin emulsions/dispersions onto 550 grams of fibre, in a flowing stream, using the 500F MDF Maxiblender to obtain a resin solids loading of either 4% or 8%. 100 grams of resin coated fibre was formed into a 255 mm×280 mm×2 mm (700 kg/m$^3$) MDF panel. The MDF panel was cut into pieces approximately 5 mm square. All of the natural fibres and fillers were dried at 60° C. for 48 hours before compounding except for the PVA bonded MDF, which was desiccant dried using silica gel under vacuum.

An OMC 19/30 twin screw co-rotating extruder (19 mm screw, L:D 30) was used for compounding with a screw speed of 150-200 rpm and a temperature range of 160-210° C. The natural fibres/fillers and polypropylene pellets were fed in two separate streams. The polypropylene was fed first, followed by the natural fibre/filler partway along the extruder barrel. The mixture was extruded through a die, which formed a 3 mm-diameter strand. To minimise moisture uptake, the extruded strand was not cooled in a water bath and pelletised as standard, but was air cooled and ground using a Wiley mill through a 4 mm mesh. The samples produced are given below.

TABLE 5

Wood fibre polypropylene composites produced

| | | Composition (%) | | | | |
|---|---|---|---|---|---|---|
| Label | Fibre | fibre | PP | Epolene 3015[a] | Michem 43040[b] | PVA[b] |
| M-M | MDF bonded | 36.8 | 60 | — | 3.2 | — |
| M-ME | MDF bonded | 38.4 | 58.25 | 1.75 | 1.6 | — |
| M-PVA | MDF bonded | 36.8 | 60 | — | — | 3.2 |
| WF | wood flour | 40 | 60 | — | — | — |
| WF-E | wood flour | 40 | 56.5 | 3.5 | — | — |
| PP-E | PP control | | 96.5 | 3.5 | — | — |
| PP | PP control | | 100 | — | — | — |

[a]applied in extruder
[b]applied by spraying into the flowing fibre stream, pressed and bonded as in a MDF sheet-making process then chopped into fibre concentrates for mixing in extruder with PP to make pellets for final injection moulding. WF = references/control also.

The sample sets are labelled with the fibre type first (M=MDF, WF=wood flour) followed by any additives after the hyphen (E=Epolene solid MAPP, M=Michem MAPP emulsion. PVA=poly(vinyl acetate)).

The compounded materials were re-dried at 60° C. for 48-72 hours before injection moulding. The dry pellets were injection moulded using a Boy 15S injection moulder (28 mm screw, 20:1 L:D), using a screw speed of 100-200 rpm, and a temperature range of 200–230° C.

In all cases the feeding in of pellets or chopped sheet into the extruders was much more convenient than using loose fibres (or flour), which were difficult to introduce uniformly in any metered way, and also easier than handling of wood flour or sander dust.

Mechanical Property Testing

The samples were evaluated as to their tensile, flexural, and impact properties as described in Example 1.

Tensile Properties

The tensile test results are given below Table 6.

TABLE 6

Tensile test results

| Label | Strength/MPa | Strain at break/% |
|---|---|---|
| M-M | 32.98 | 1.56 |
| M-ME | 46.58 | 1.83 |
| M-PVA | 20.81 | 3.16 |
| WF | 21.11 | 2.97 |
| WF-E | 29.56 | 1.77 |
| PP | 25.16 | 40.94 |
| PP-E | 23.23 | 6.71 |

Composite samples prepared with the MDF fibre were examples of the invention. The PVA bonded example illustrates that other resins can be used to aid fibre introduction via the fibre pellet process and good moduli data are obtained. In this PVA case the fibre-PP (matrix) interaction is unoptimised. The use of alternative, more polar, matrix and/or added coupling in the matrix would be able to be used to improve the overall performance in using PVA, or other adhesively bonded MDF. The use of PVA and Michem adhesives to bind MDF into sheets prior to pellet-making from the sheets, were applied via an example of the process of the invention to the MDF fibre composites led to increases in the tensile modulus. SEM micrographs of the composites show the different types of fibre are separated rather than being in fibre bundles, such as may be originally present in the fibre concentrates or pressed sheets.

The addition of natural fibre reduced the maximum tensile stress of the uncoupled polypropylene composites in all cases. There were no significant differences in the tensile strength of the different fibre composites when no additives were used.

The addition of Michem (via precoating, sheet-making and chopping into fibre concentrate prior to extrusion ad injection moulding) increased the maximum tensile stress above that of unfilled polypropylene. The examples M-M and M-ME represent examples of the invention in a preferred mode, wherein the binder is applied can also act as compatibiliser. Superior properties are observed.

Thus, the invention has provided a convenient route to introducing fibres and compatibiliser into plastics via the use of precoated pellets, prepared by essentially an MDF-type process, followed by cutting of the MDF-like sheet.

Flexural Properties

The flexural test results are given in Table 7. The stress (strength) values given are at 5% strain. Beyond this point these specimens still showed an increasing load.

TABLE 7

Flexural test results

| | Modulus/GPa | Strength/MPa |
|---|---|---|
| M-M | 3.59 | 57.95 |
| M-PVA | 4.04 | 39.78 |
| WF | 3.14 | 40.78 |
| WF-E | 3.06 | 53.55 |
| PP | 1.05 | 33.81 |
| PP-E | 1.06 | 38.29 |

*samples did not break before 5% strain, values given are for stress at 5% strain The addition of the natural fibres increased the flexural modulus of all samples compared to unfilled polypropylene. The addition of Michem or PVA improved the flexural modulus of the MDF composites. The addition of the natural fibres increased the maximum flexural stress of all the composites compared to unfilled polypropylene. The addition of Michem also improved the flexural strength.

Impact Properties

The impact strength test results for natural fibre filled polypropylene composites are listed below in Table 8.

TABLE 8

Impact test results

| | Impact Energy J/m2 |
|---|---|
| M-M | 46.5 |
| M-ME | 45.5 |
| M-PVA | 45.7 |
| WF | 40.3 |
| WF-E | 43.7 |
| PP | 102.6 |
| PP-E | 105.3 |

The MDF (M) fibre samples gave higher impact strengths than the wood flour (WF) samples.

Thus, in summary the use of longer aspect ratio fibres (eg MDF fibres) manufactured as pellets with compatibilser, manufactured and introduced via the methods of the invention lead to superior performance in strength, stiffness and impact properties compared to wood flour or similar products. Even uncompatiblised (for PP matrix. PVA bondedicoated fibres) pellets have equivalent or superior performance to uncompatibilised wood flour usage, and are more easily handled and processed in metered additions.

EXAMPLE 2A

In a further set of composites produced as described in Example 2, at different fibre loadings (20-60 wt %) the following data were obtained, illustrating that the unoptimised fibre-pellets perform better than wood flour, in addition to being more readily introduced to plastics processing machinery.

TABLE 9

Impact strength of Further Composites

| Sample | Impact Strength Average (J/m) |
|---|---|
| 20% M-PVA | 45.27 |
| 40% M-PVA | 45.69 |
| 60% M-PVA | 30.00 |
| 20% WF | 42.46 |
| 40% WF | 40.34 |
| 60% WF | 26.22 |

Commonly used resins for MDF such as urea-formaldehyde (UF) resins, melamines, isocyanates etc as well as PVAs—and other common resins, may also be used with good effect to aid fibre pellet manufacture for subsequent introduction in to extruders or injection moulders

EXAMPLE 3

Wood Fibre Biopolymer Composites

Materials and Sample Production

Three resins, a starch, a poly-vinyl alcohol (PVAl), and a melamine-urea-formaldehyde (MUF) resin were each, added, in separate experiments, to MDF fibre (thermomechanical pulp from the MDF refiner blowline at NZ Forest Research Institute, Run 128), by spraying or injecting the polymer additives, as a dispersion or solution in water, using a Laboratory Maxiblender. The Maxiblender blows a fibre stream with air or steam or gas with high turbulence, and has an injection port for spraying resin or additives onto the flowing fibre stream. The impregnated MDF fibres were then collected and pressed into two millimetre thick 300×300 mm panel using heat and pressure and subsequently processed into 5 mm square pellets. The MDF pellet squares were made from sheet and extrusion compounded with biopolymer PLA (polylactic acid) and polyhydroxybutyrate (Biopol) at 180-200° C. Various compositions of fibre reinforced biopolymers with 40% (w/w) fibre content were thus made and pelletised and then injection moulded into test specimens, as listed in Table 10 below.

TABLE 10

List of MDF filled-biopolymer composites made.

| Polymer Label | Description of Fibre and Additives |
|---|---|
| BP = Biopol; PLA = polylactic acid | |
| BP - 4% Starch[a] | 40% MDF squares from Run128 with 4% Gelose starch 173/ 60% Biopol G400 |
| BP - 4% PVAl[a] | 40% MDF squares from Run 128 with 4% poly-vinyl-alcohol/ 60% Biopol G400 |
| BP - 2% MUF[a] | 40% MDF squares from Run 128 with 2% melamine-urea-formaldehyde/60% Biopol G400 |
| Pure BP Polymer | 100% Biopol G400 |
| PLA - 4% Starch[a] | 40% MDF squares from Run 128 with 4% Gelose starch 173/ 60% PLA 3001D |
| PLA - 4% PVAl[a] | 40% MDF squares from Run 128 with 4% poly-vinyl-alcohol/ 60% PLA 3001D |
| Pure PLA Polymer | 100% PLA 3010D |

[a]applied by spraying into the fibre stream

The additives used were a melamine-urea-formaldehyde (MUF) added at two percent, an Aldrich 90% hydrolysed poly-vinyl alcohol (PVAl), and a Penford's plasticised Gelose starch 173.

The poly-vinyl alcohol (PVAl) was dissolved into solution at 10% solids using a temperature-controlled stirrer-hotplate to keep the temperature at 90° C. The solution was then cooled and the solution sprayed onto the fibre. Due to the low solids the fibre had to dried for two hours before being resprayed with a second quantity (2% based on solids to MDF fibre solids) to bring the level of additive up to the required, for this comparison, 4% solids. Lower or different levels may be applied. The invention provides a convenient route to introducing difficult materials such as polyvinylalcohol (commonly available as solutions or films) in to reinforced plastics by first pre-coating the fibres and then pelletising via the MDF-type processes and pressing methods.

Penford's Gelose Starch 173 was dissolved in a mixture of water and glycerol (20:80) to prepare the plasticised starch for spraying onto MDF fibre (27.31% starch content in dispersion)/solution).

Reference samples with wood flour added at 40 wt % in biopolymer were also produced (PLA-WF and BP-WF). The wood flour[1] (WF) used was standard grade *Pinus Radiata* supplied by Kingsland Seeds. A sieve analysis of the flour indicated a particle distribution with >77%<250 microns.

| Size (mm) | Weight (g) | % |
|---|---|---|
| <0.063 | 0.04 | 0.2 |
| 0.063-0.125 | 0.36 | 27.3 |
| 0.25-0.5 | 0.75 | 49.8 |
| 0.5-1 | 2.5 | 15 |
| >1 | 1.37 | 7.2 |
|  | 0.01 | 0.8 |

The bioplastics were dried according to manufacturer's recommendations, typically from 60-80° C. for 2-4 hours.

An OMC 19/30 twin screw co-rotating extruder (19 mm screw, L:D 30) was used for compounding with a screw speed of 120 rpm and a temperature range of 140-170° C. for Biopol extrusion and 170-190° C. for PLA. The pre-compressed MDF squares and biopolymer pellets were fed in two separate streams. The biopolymer was fed first, followed by the MDF squares partway along the extruder barrel, nearer the exit die. The 40% MDF/60% biopolymer and additives were extruded through a die, which formed a 3 mm-diameter strand. The strand was pelltised with a Laboratory Pelletiser.

The Biopol-MDF compounded materials were re-dried at 60° C. for 24 hours before injection moulding into test specimens. The test specimens were moulded using a Boy 15S injection moulder (28 mm screw, 20:1 L:D), using a screw speed of 100-200 rpm, and a screw temperature range of 150-190° C.

PLA-MDF compounded materials were re-dried at a temperature of 80° C. for 24 hours before injection moulding into test specimens. The test specimens were moulded using a Boy 15S injection moulder (28 mm screw, 20:1 L:D), using a screw speed of 100-200 rpm, and a screw temperature range of 165-210° C.

The compounded WF pellets were re-dried at 40° C. until the moisture content was below 0.5%, typically for 5-8 days, then dried at 80° C. for two hours immediately before injection moulding. The dry pellets were injection moulded using a Boy 15S injection moulder (28 mm screw, 20:1 L:D) using similar conditions as above.

Mechanical Property Testing

Samples were conditioned at 23° C. and 50% RH for 1 week before measurement and testing.

Flexural properties were evaluated according to ASTM method D790-96a[8], except that the loading nose and supports had radii of 7.5 mm. An Instron model 5567 test machine was used for testing the three point bending specimens and was equipped with a 10 kN load cell. A span of 50 mm and speed of 1.3 mm/min was used for flexural tests.

The densities and flexural properties of the MDF filled biopolymer composites are given below in Tables 11 and 12.

TABLE 11

Densities of MDF filled Biopolymer samples

| Label of Sample | Density Average (kg/m$^3$) |
|---|---|
| BP - Starch | 1304 |
| BP - PVAl | 1296 |
| BP - MUF | 1293 |
| Pure BP polymer (neat) | 1234 |

TABLE 11-continued

Densities of MDF filled Biopolymer samples

| Label of Sample | Density Average (kg/m$^3$) |
|---|---|
| PLA - Starch | 1310 |
| PLA - PVAl | 1303 |
| Pure PLA polymer (neat) | 1254 |

TABLE 12

Flexural Properties of MDF - Biopolymers

| Sample | Modulus (GPa) | Stress at Max Load (MPa) |
|---|---|---|
| PLA - Starch | 6.92 | 100.9 |
| PLA - PVAl | 7.93 | 110.6 |
| PLA - neat | 3.82 | 116.6 |
| PLA - WF ref | 6.43 | 78.4 |
| BP - Starch | 4.58 | 54.8 |
| BP - PVAl | 6.43 | 61.0 |
| BP - MUF | 5.23 | 51.9 |
| BP - neat | 7.52 | 50.5 |
| BP - WF ref | 5.45 | 45.5 |

Neat = plastic without fibre present.
WF = wood flour added at 40%.
Others = 40% loading fibre, as in Table 10 above - with pre-impregnated MDF fibre, according to the invention.

Significant improvements in properties such as strength are achieved in the bioplastics by use of the pre-coated fibre pellets as manufactured by the process of the invention, compared to a wood flour reference. Particular benefits are seen from the use of polyvinylalcohol as the fibre coating. Modified polyvinyl alcohols and/or copolymers may be expected to perform well as fibre coatings also. Even the use of MUF, a thermoset resin binder, provides performance advantages over reference materials (wood flour), in addition to aiding introduction of wood fibre into the extruder or moulding machine.

EXAMPLE 4

Direct Injection Moulding of Pellets Made by the Invention

Wood fibre pellets with polyvinylacetate (National Starch; 4% dry weight loading on fibres) were manufactured according to the invention as previously described and cut into 5 mm squares and dried. The pellets were then injection moulded with added PLA, as above with simple pre-mixing of the fibre pellets with added plastic (PLA)_pellets to produce injection moulded samples.

The directly injection moulded fibre pellets with added polymer exhibited a flexural strength of 67.9 MPa and a flexural modulus of 6.27 GPa at a fibre loading in the final plastic composite of about 20 wt %. Thus this high modulus was achieved with fibres present at a loading of ~20 wt %—about half that of the wood flour loading used in Example 3 to achieve a similar modulus. Through simple optimisation of the additives, as described earlier, further enhanced performance would be achieved. This demonstrates that direct injection moulding (no intermediate extrusion compounding) of the fibre pellets with added polymer can be achieved.

EXAMPLE 5

MDF Manufacturing Pilot Plant Trials

Trials at an MDF pilot plant at NZ Forest Research Institute were undertaken using refiner-blowline polymer addition, as in the MDF or particleboard industries, for the production of fibre-polymer pellet feedstocks for use in plastic processes.

Fibre from wood chips was produced in the Forest Research Mechanical Pulping Pilot Plant under typical conditions for high temperature/mechanical pulps, as used in MDF industry.

Michem 43040 emulsion was added to hot fibre in the MDF refiner-blowline and dried at 140° C. in a tube drier to a targeted moisture content of 12 to 16%. The MDF fibre was pressed into two millimetre thick 300×300 mm panels at three densities (500, 700 and 900 kg/m$^3$) and subsequently processed (chopped) into 5 mm squares. The MDF squares were made from sheet with coupling agent additives and then extrusion compounded with polypropylene on an extruder at 180-200° C. Various compositions of fibre reinforced polypropylene with 40% (w/w) fibre content were then made and pelletised before being injection moulded into test specimens.

The results indicate that the addition of an emulsified coupling agent or binder to the blowline of a commercial MDF plant and manufacturing of the pellets in a process representative of commercial MDF or particleboard manufacturing, will give a similar performance to the laboratory examples earlier and with a performance and processability superior to wood flour equivalents.

The binder or coupling agent may be added at various points in the refiner-blowline process and could be added at the refiner, or at various points along the blowline. Two or more points of addition may be used to apply the same or different polymers or additives sequentially.

Materials

Example trial fibres of thermo-mechanical pulp—MDF fibre were produced on the PAPRO pilot plant refiner at Forest Research, Rotorua. Fibre 129 had 4% Michem emulsion injected onto the fibre which was flowing in the blowline.

The polypropylene resin used was Hyundai Séetec grade M1600 supplied as pellets. The maleic anhydride modified polypropylene emulsion used was Michem 43040 (a non-ionic emulsion) supplied by Michelman Inc.

Approximately 20 kg of coated fibres for each run was dried using the MDF drying tube to blow hot (140-160° C.) air onto fibre that was collected with a cyclone dropping the fibre into a plastic bag.

The fibre was measured for moisture content and adjustments made to correct for variation in moisture content. Michem 43040 was added to hot fibre at the MDF refiner blowline and coated fibre was dried at 140° C. to a targeted moisture content of 12 to 16%. The MDF fibres were pressed into two millimetre thick 300×300 mm panels at three densities (500, 700 and 900 kg/m$^3$) at 180 C and subsequently processed or chopped into 5 mm squares. The pellets were compounded with polypropylene on an extruder at 180-200° C. and pelletised before being injection moulded into test specimens. Other dimensions for the sheets or the pellets are of course entirely feasible. All of the pre-compressed MDF squares, with coupling agent, were dried at 60° C. for 48 hours before compounding.

The samples produced are listed below in Table 13.

TABLE 13

List of MDF fibre-plastics made.

| Label | Description of Fibre and Coupling Agents | Density of 2 mm Panel (kg/m$^3$) |
| --- | --- | --- |
| 500M4 | Run 129 4% Michem addition | 500 |
| 700M4 | Run 129 4% Michem addition | 700 |
| 900M4 | Run 129 4% Michem addition | 900 |

$^b$applied by spraying onto fibre

500M4-900M4: MDF fibres as above, pressed in the presence of 4% Michem G3015 coupling agent that was added in the blowline. Fibre hot-pressed at 180° C. for 1 minute to different densities.

An OMC 19/30 twin screw co-rotating extruder (19 mm screw, L:D 30) was used for compounding with a screw speed of 180 rpm and a temperature range of 180-200° C. The pre-compressed MDF squares and polypropylene pellets were fed in two separate streams. The polypropylene was fed first, followed by the MDF squares partway along the extruder barrel. The 40% MDF (with coupling agents precoated/applied)/60% polypropylene agents mixture was extruded through a die, which formed a 3 mm-diameter strand which was pelletised into ~5 mm length pellets using a laboratory pelletiser.

The compounded materials were re-dried at 60° C. for 24 hours before injection moulding into test specimens. To ensure the test specimen completely filled the mould cavity. The test specimens were moulded using a Boy 15S injection moulder (28 mm screw, 20:1 L:D), using a screw speed of 100-200 rpm, and a temperature range of 200-245° C.

Mechanical Property Testing

Samples were conditioned at 23° C. and 50% RH for 1 week before measurement and testing.

Tensile properties were evaluated according to ASTM method D638-96 (Type I)[3]. An Instron model 5567 test machine was used for testing, equipped with a 10 kN load cell and 25 mm extensometer. The initial separation between grips was 100 mm, with a testing speed of 5 mm/min.

Flexural properties were evaluated according to ASTM method D790-96a[8], loading nose and supports had radii of 7.5 mm. An Instron model 5567 test machine was used for testing, equipped with a 10 kN load cell. A span of 50 mm and speed of 1.3 mm/min was used for flexural tests.

Sample Densities

The densities of the MDF filled polypropylene composites are given below in Table 14.

TABLE 14

Densities of MDF filled polypropylene samples

| Label | Density Kg/m3 |
| --- | --- |
| FR Refiner/Blowline | |
| 500M4 | 1047 |
| 700M4 | 1054 |
| 900M4 | 1060 |
| PP | 890 |

Tensile Properties

The tensile test results are given below in Table 15.

TABLE 15

Tensile test results

| Sample | Modulus/GPa | Strength/MPa | Strain/% |
|---|---|---|---|
| 500M4 | 4.66 | 42.7 | 1.97 |
| 700M4 | 4.39 | 41.2 | 1.78 |
| 900M4 | 4.63 | 39.4 | 1.55 |
| PP | 1.39 | 25.2 | 40.9 |

Flexural Properties

The flexural test results are given below in Table 16.

TABLE 16

Flexural test results

| | Modulus | Stress at Max Load |
|---|---|---|
| 500 M4 | 4.33 | 72.9 |
| 700 M4 | 4.37 | 71.8 |
| 900 M4 | 4.54 | 71.5 |
| PP | 1.05 | 33.8 |

*samples did not break before 5% strain, values given are for stress at 5% strain The addition of Michem 43040 binder dramatically improved the tensile and flexural strength of MDF fibre/polypropylene. There was no significant gain in performance when the level of Michem 43040 was increased from 4%, though other levels including lower loadings are entirely feasible. The addition of Michem 43040 to MDF fibre in the pilot plant blowline indicates a similar level of performance achieved in the Laboratory Blender trials. MDF sheet at various densities were able to be used as feedstock for pellets.

REFERENCES

1 Schut Jan. H., Wood is Good for Compounding, Sheet & Profile. Online article from http:/www.plasticstechnology.com/articles/199903fa1.html (1999).
2 North Wood Plastics Inc., 3220 Crocker Avenue, Sheboygan, W I. 53081 USA, http://www.northwoodplastics.com
3 Brooke, J. G., Goforth, B. D., Goforth, C. L., U.S. Pat. No. 5,082,605, 1992.
4 Deaner, M. J., Puppin, G., Heikkila., U.S. Pat. No. 5,827,607, 1998.
5 Stark. N. M., Rowlands, E. R. (2003). Effects of wood fiber characteristics on mechanical properties of wood/polyproplyene composites. Wood and Fiber Science, 35(2), pp 167-174.
6 Loxton, C., Thumm, A., Grigsby, W. J., Adams, T. and Ede, R. (2000). Resin Distribution in Medium Density Fibreboard: Quantification of UF Resin Distribution on Blowline Blended MDF Fibre and Panels. In Proc. 5th Pacific Rim Biobased Composites Symposium, Canberra. December 10-13, pp 234-242.
7 ASTM D638-96: Standard Test Method for Tensile Properties of Plastics.
8 ASTM D790-96a: Standard Test Method for Flexural Properties of Unreinforced and Reinforced Plastics and Electrical Insulating Materials.
9 Sears K. D et al (2001). Proc. $6^h$ International Conference on Woodfibre Plastics Composites, Forest Products Society, 2001, p 27-34 and U.S. Pat. No. 6,270,883.

The invention claimed is:

1. A process for producing pellets or granules comprising wood fibres, for use as a feedstock in plastics manufacture, which comprises
    applying to wood, wood fibres or fibre bundles prior to a blowline, the wood fibres or fibre bundles being produced by mechanically or thermomechanically or chemo-thermomechanically or chemo-mechanically breaking down the wood in a refiner, a liquid formulation comprising one or more thermoplastic polymers, monomers, or oligomers to coat or partially coat the fibres,
    pressing the fibres into a solid product, and
    breaking down the solid product into wood fibre-containing pellets or granules,
    the pellets or granules comprising 0.3 to 25 parts per 100 parts of fibre by dried weight of one or more thermoplastic polymers or thermoplastic oligomers.

2. The process of claim 1, comprising applying the liquid formulation to the fibres in the refiner.

3. The process of claim 1, further comprising applying to the fibres while conveying the fibres in an air stream a formaldehyde or isocyanate resin, or a further liquid formulation comprising one or more thermoplastic polymers, monomers, or oligomers.

4. The process of claim 2, further comprising applying to the fibres while conveying the fibres in an air stream a formaldehyde or isocyanate resin, or a further liquid formulation comprising one or more thermoplastic polymers, monomers, or oligomers.

5. The process according to claim 3 including conveying the fibres along a conduit in a dry or wet stream and introducing the formaldehyde or isocyanate resin or liquid formulation into the interior of the conduit to apply the formaldehyde or isocyanate resin or liquid formulation to the fibres while the fibres are moving through the conduit, or introducing the formaldehyde or isocyanate resin or liquid formulation into the conduit by spraying the formaldehyde or isocyanate resin or liquid formulation into the interior of the conduit as the fibres move through the conduit, to coat or partially coat the fibres.

6. The process according to claim 4 including conveying the fibres along a conduit in a dry or wet stream and introducing the formaldehyde or isocyanate resin or liquid formulation into the interior of the conduit to apply the formaldehyde or isocyanate resin or liquid formulation to the fibres while the fibres are moving through the conduit, or introducing the formaldehyde or isocyanate resin or liquid formulation into the conduit by spraying the formaldehyde or isocyanate resin or liquid formulation into the interior of the conduit as the fibres move through the conduit, to coat or partially coat the fibres.

7. The process according to claim 1 including conveying the fibres along a conduit in a dry or wet stream wherein the conduit conveys the fibres from the refiner in a plant for manufacture of fibre board.

8. The process according to claim 2 including conveying the fibres along a conduit in a dry or wet stream wherein the conduit conveys the fibres from the refiner in a plant for manufacture of fibre board.

9. The process according to claim 5 wherein the conduit conveys the fibres from the refiner in a plant for manufacture of fibre board.

10. The process according to claim 6 wherein the conduit conveys the fibres from the refiner in a plant for manufacture of fibre board.

11. The process according to claim 1 including conveying the fibres along a conduit in a dry or wet stream wherein the conduit conveys the fibres to or from a drying stage or drier.

12. The process according to claim 2 including conveying the fibres along a conduit in a dry or wet stream wherein the conduit conveys the fibres to or from a drying stage or drier.

13. The process according to claim 5 wherein the conduit conveys the fibres to or from a drying stage or drier.

14. The process according to claim 6 wherein the conduit conveys the fibres to or from a drying stage or drier.

15. The process according to claim 1 including pressing the fibres into a solid product by pressing the fibres to a solid product in planar form.

16. The process according to claim 15 including pressing the fibres between heated plattens.

17. The process according to claim 1 wherein the wood fibres or fibre bundles are MDF fibre.

18. The process according to claim 15 including pressing the fibres into a sheet of up to about 2 cm in thickness.

19. The process according to claim 1, wherein the fibres have an average fibre length or fibre-bundle length of at least about 0.8 mm.

20. The process according to claim 1, wherein a major fraction of the fibres have an aspect ratio of at least 10:1.

21. The process according to claim 1, including breaking down the solid product to produce pellets which are longer than the average fibre length of the fibres within the pellets.

22. A process for manufacture of plastics products or intermediates which includes introducing pellets or granules produced by the process of claim 1 as a feedstock into a plastics extrusion or moulding machine.

23. A process for producing pellets or granules comprising wood fibres, for use as a feedstock in plastics manufacture, which comprises applying to wood, wood fibres or fibre bundles prior to a blowline, the wood fibres or fibre bundles being produced by mechanically or thermomechanically or chemo-thermomechanically or chemo-mechanically breaking down the wood in a refiner, a liquid formulation comprising one or more thermoplastic polymers, monomers, or oligomers to coat or partially coat the fibres, conveying the fibres along a conduit in a dry or wet stream and introducing a formaldehyde or isocyanate resin or a further liquid formulation comprising one or more thermoplastic polymers, monomers, or oligomers into the interior of the conduit to apply the formaldehyde or isocyanate resin or liquid formulation to the fibres while the fibres are moving through the conduit, the conduit conveying the fibres from the refiner or to or from a drying stage or drier in a plant for manufacture of fibre board, pressing the fibres into a solid product, and breaking down the solid product into wood fibre-containing pellets or granules, the pellets or granules comprising 0.3 to 25 parts per 100 parts of fibre by dried weight of one or more thermoplastic polymers or thermoplastic oligomers.

24. The process according to claim 1, wherein the pellets or granules comprise 0.3 to 8 parts per 100 parts of fibre by dried weight of the one or more thermoplastic polymers or thermoplastic oligomers.

25. The process according to claim 23, wherein the pellets or granules comprise 0.3 to 8 parts per 100 parts of fibre by dried weight of the one or more thermoplastic polymers or thermoplastic oligomers.

\* \* \* \* \*